Feb. 5, 1952 — J. L. CRASTON — 2,584,427
PROCESS OF SEALING GLASS TO SAPPHIRE
Filed Aug. 29, 1949

John Leslie Craston
Inventor
By Roberts B. _____ Attorney

Patented Feb. 5, 1952

2,584,427

UNITED STATES PATENT OFFICE 2,584,427

PROCESS OF SEALING GLASS TO SAPPHIRE

John L. Craston, Malvern, England

Application August 29, 1949, Serial No. 112,913
In Great Britain September 11, 1948

11 Claims. (Cl. 49—82)

1

This invention relates to the sealing of glass to non-metallic substances which have an exceedingly high melting point and possess a single crystal structure or are supercooled liquids, and which possess substantially the same coefficients of expansion as that of some known form of glass. These substances include sapphire and will hereinafter be referred to as "sapphire and like substances." They have a melting point of the order of 2,000 degrees centigrade or above.

The sealing of glass to sapphire and like substances is required to be effected for example, in the construction of infra-red-sensitive photoconductive cells. These cells comprise an active layer of lead sulphide or lead selenide contained in an evacuated envelope which is transparent to infra-red rays. It is found that glass does not possess sufficiently good transmission characteristics for the larger infra-red wavelengths. However, sapphire in its natural state, or artificially produced, has been found to possess an adequate transmission characteristic for the larger infra-red wavelengths, and therefore, it is now proposed to employ a sapphire window for the evacuated glass envelope of a cell placed in such a position that infra-red rays passing through it impinge on the active layer. Thus, it is required that a suitable glass to sapphire seal be provided to seal the sapphire window to the glass envelope. Furthermore, the processing of infra-red sensitive layers involves baking the cells at high temperature and, therefore, the sapphire to glass seal must be capable of withstanding high temperatures. With this object in view, sufficiently high melting point glass must be used for effecting the seal.

For an effective seal to be produced between, say, sapphire and glass, it is necessary that the surfaces of the sapphire to be sealed be "wetted" by the glass, so that the glass becomes adhesive to the sapphire. It is also necessary that the two substances to be joined shall have substantially the same coefficient of thermal expansion. It has been found that at the temperature at which wetting will occur the glass possesses such a fluidity that control cannot be maintained of the shape of the glass seal and also of the area over which the seal is to be effective. Sapphire is known to be of crystalline structure and to have two coefficients of linear thermal expansion, one being measured in the direction of the optic axis of the crystal, and the other being measured in directions perpendicular to the optic axis of the crystal. These two coefficients are, however, sufficiently close together to permit their mean to

2 be taken as the coefficient of expansion of the sapphire, the tolerance applicable in choosing the coefficient of expansion of the glass to be used exceeding their variation from the mean.

The object of the invention, therefore, is to provide an improved process for sealing glass to sapphire and like substances.

A further object of the invention is to provide such a process in which the seal produced is capable of withstanding high temperatures.

According to the present invention, there is provided a process for the high temperature sealing of glass to sapphire and like substances which comprises wetting the surface of the sapphire or like substance to which the seal is to be applied by placing a small quantity of glass of substantially the same coefficient of linear thermal expansion as that of the sapphire or like substance in contact with the sapphire or like substance and raising the temperature of the sapphire or like substance with the glass in contact with it to a temperature greatly in excess of the melting point of the glass, bringing the glass body to be sealed to said sapphire or like substance into contact with the wetted surface, the wetted sapphire or like substance and the glass body both being maintained meanwhile at a uniform temperature such that the glass body is softened but control of its shape is maintained, and annealing the seal so formed. It is desirable that the melting point of the surface wetting glass be substantially the same as at least the sealed portion of the glass body.

According to a feature of the invention, the glass used for the wetting process is so chosen in quantity and shape that when completely fluid it will just cover the area over which the seal is to be effective. Preferably the surface of the glass used for wetting is ground and polished so as to preclude bubble formation upon melting.

According to another feature of the invention, the process comprises placing the sapphire or like substance and the glass used for wetting it in contact in a crucible, heating to such a temperature that the glass becomes completely fluid and wets the sapphire or like substance over the sealing area, lowering the temperature and bringing the glass body to be sealed to the sapphire or like substance into contact with the sealing area at a controlled rate so that its temperature is brought to the temperature of the sealing area at a determined rate, the temperature of the sealing area being such that the glass body to be sealed to the sapphire or like substance at that temperature is softened but is not so fluid that control is lost of its shape. When the junction of the two surfaces has taken place the seal so formed is then annealed.

For the purposes of this specification and appended claims, the "glass body" to be sealed to the sapphire or like substance is defined as being comprised wholly of glass of substantially the same coefficient of linear thermal expansion as the sapphire or like substance or as including glass graded away from the area to be sealed to the sapphire or like substance in known manner, the grading of the glass being such that the glass surface at which the seal is to be made consists of glass of substantially the same coefficient of linear thermal expansion as the sapphire or like substance.

In order that the invention may be more clearly understood, one method of high temperature sealing of glass to sapphire will now be described by way of example with reference to the drawings accompanying this specification in which.

Figure 1:
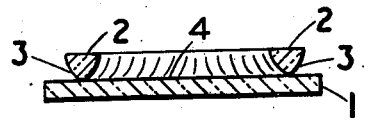
Fig. 1 shows a cross sectional view of a sapphire disc to which glass is to be sealed at one stage of the process.

Fig. 1 shows a sapphire disc 1 of single crystal structure which is required to be sealed over the end of a glass tube 11 the lower portion of which is constructed of graded glass. The sapphire 1 carries on its upper surface 4 a ring 2 of glass having substantially the same coefficient of linear thermal expansion as sapphire. The height of the ring 2 is chosen so that the volume of glass in the ring provides a sufficient quantity of glass to wet the required sealing area when molten. It has a mean diameter equal to that of the seal to be made. The surfaces 3 of the ring 2 are ground and polished so as to preclude any appreciable bubble formation when the glass melts.

Figure 2:
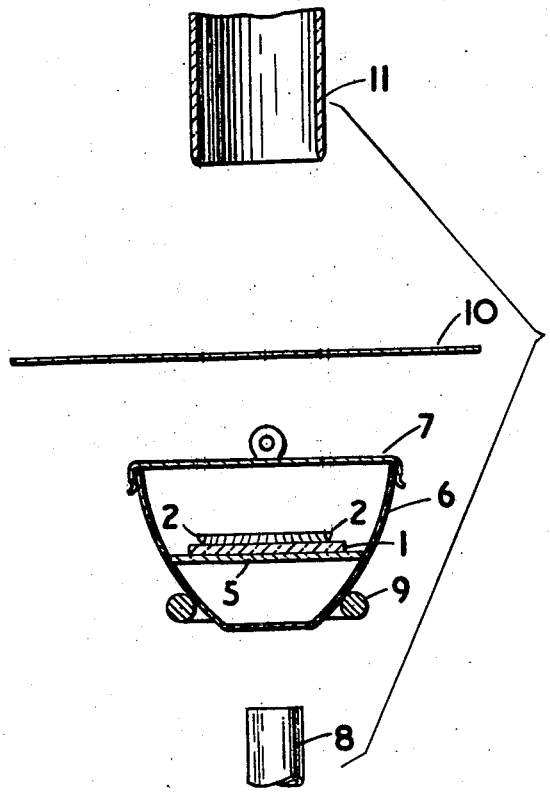
Fig. 2 shows diagrammatically a side view of apparatus used in the process according to the invention.

Fig. 2 shows the sapphire disc 1 carrying the ring of glass 2 on its upper surface supported on a carbon platform 5 in a crucible 6 which has a lid 7. An oxy-hydrogen burner 8 is provided for heating the crucible. The crucible 6 is held in position by supports 9 on a stand (not shown) which also supports a mica plate 10 and the glass tube 11 which is to be sealed to the sapphire disc 1. The graded glass of tube 11 is constructed of glasses the coefficients of linear thermal expansion of which vary successively from that of sapphire to that of the glass of which the body of the glass tube 11 (i. e., the ungraded part, is made, the glass surface to be sealed directly on to the sapphire that is, the sealing surface, being constituted of glass having substantially the same coefficient of linear thermal expansion as sapphire.

The sapphire disc 1 and carbon plate 5 are levelled with a spirit level within the crucible so that any molten glass on the surface of the sapphire will not tend to flow in any one particular direction. The glass tube 11 is arranged vertically above the sapphire disc 1 and the glass ring 2, and the stops on the stand (not shown) are so arranged that in the absence of the glass ring 2 it will be spaced above the upper surface of the sapphire disc 1 when lowered to its full extent slightly less than the height of the ring 2 before melting. A mica sheet 10 is interposed between the crucible 6 and the glass tube 11 so that the heating of the crucible 6 will not melt the tube 11.

Figure 3:
Fig. 3 shows the arrangement shown in Fig. 1 at a subsequent stage of the process.

The process is carried out as follows. The crucible 6 is heated by the oxy-hydrogen burner 8 to about 1,100° C. Fig. 3 shows the arrangement of Fig. 1 at this temperature when the glass ring 2 of Fig. 1 collapses and wets the surface 4 of the sapphire 1, thus forming a wetted annular sealing area 12 onto which the seal is to be lowered. Referring again to Fig. 2, the lid 7 of the crucible 6 may be lifted from time to time so that this stage of the process may be inspected. The oxy-hydrogen flame is now turned down and the crucible temperature reduced to about 800° C. When brought to this temperature the graded glass of tube 11 will become soft without control of its shape being lost. The crucible lid 7 and the mica sheet 10 are then removed and the glass tube 11 is slowly lowered to its full extent and held in position for approximately half a minute in contact with the wetted surface of the sapphire 1, by which time adhesion between the surfaces is complete. It will be noted that as a precaution against the cracking of the sapphire, care is taken to maintain the sapphire during the wetting process and the glass subsequently brought into contact with the sapphire at controlled uniform temperatures so that undue stresses due to local heating and cooling are not incurred. The lowermost position of the sealing surface of the glass tube 11, it has been stated above, was arranged to be a little lower than the initial height of the glass ring 2. When it melts the ring 2 loses some height and thus must be taken into account and the steps controlling the movement of the glass tube 11 adjusted so that the sealing surface of the tube 11 just dips into the molten glass on the sapphire surface. When the seal is complete any thickening of the glass around the seal is removed by blowing. It is then removed to an oven and kept at the upper annealing temperature of the glass of which the ring 2 is made (i. e., 470° C.) in this example for about one hour and subsequently slowly cooled to room temperature.

The invention is obviously not limited to anoxyhydrogen flame as a means for heating the sapphire. For example, a furnace may be used having a removable cover so that the glass tube can be introduced into the furnace at the appropriate stage of the process in a controlled manner as previously described with reference to Fig. 2.

Obviously, the specific temperatures referred to in the above description only apply to seals made of sapphire and the particular type of glass chosen in the example, and are given only by way of example. Other temperatures may be found to be more appropriate to other seals made by a process according to the invention with different substances. Furthermore, the seal need not necessarily take the form of a ring, but may be of any desired shape or size, and may be either hollow or solid in cross-section. Depending on the shape of the seal to be made, the "melting glass" may take the form of a slip of glass to be placed on the surface of the sapphire or like substance as long as the area wetted in the process conforms substantially to the area over which the seal is to be effective.

I claim:

1. A process for the high temperature sealing of a glass body to sapphire which includes the steps of placing in contact with the sapphire a small quantity of glass of substantially the same coefficient of linear thermal expansion as that of the sapphire and also having a melting point substantially as high as that of the glass body at the region of the seal, raising the temperature of the sapphire with the glass in contact with it to a temperature greatly in excess of the melting point of the glass until the surface of the sapphire to which the seal is to be applied is wetted by the glass lowering the temperature and bringing the glass body into contact with the wetted surface at a temperature such that the glass body adheres to the wetted surface without control of its shape being lost.

2. A process for the high temperature sealing of a glass body to sapphire which includes the steps of placing in contact with the sapphire a small quantity of glass of substantially the same coefficient of linear thermal expansion as that of the sapphire and also having a melting point substantially as high as that of the glass body at the region of the seal, raising the temperature of the sapphire with the glass in contact with it to a temperature greatly in excess of the melting point of the glass the small quantity of glass being so chosen in quantity and being provided in a form of such shape that it will just wet the sapphire over a predetermined sealing area at this temperature, lowering the temperature and bringing the glass body into contact with the wetted surface at a temperature such that the glass body adheres to the wetted surface without control of its shape being lost.

3. A process for the high temperature sealing of a glass body to sapphire which comprises placing the sapphire with a small quantity of glass of substantially the same coefficient of linear thermal expansion as the sapphire and having a melting point substantially as high as that of the glass body at the region of the seal suitably positioned thereon in a crucible, heating to such a temperature that the glass wets the sapphire over the sealing area, lowering the temperature and bringing the glass body to be sealed to the sapphire into contact with the sealing area at a controlled rate such that the temperature of its sealing surface is brought substantially to the temperature of the sealing area at a predetermined rate, the temperature of the sealing area being such that the sealing surface of the glass body to be sealed to the sapphire becomes united to the wetted area without the glass body becoming softened beyond the point at which control of its shape is lost.

4. A process for the high temperature sealing of a glass body in the form of a tube to a disc of sapphire which comprises placing the disc with a glass ring of substantially the same cross-section as that of the glass tube and having substantially the same coefficient of linear thermal expansion as the sapphire or like and having a melting point substantially as high as that of the glass body at the region of the seal suitably positioned thereon in a crucible, heating to such a temperature that the glass wets the disc over the sealing area, lowering the temperature and bringing the glass tube to be sealed to the disc into contact with the sealing area at a controlled rate such that the temperature of its sealing surface is brought substantially to the temperature of the sealing area at a predetermined rate, the temperature of the sealing area being such that the sealing surface of the glass tube becomes united to the wetted area without the tube becoming softened beyond the point at which control of its shape is lost.

5. A process for the high temperature sealing of a sapphire disc to a glass body in the form of a tube which includes the steps of placing in contact with the disc a ring of glass having substantially the same coefficient of linear thermal expansion as that of sapphire, of substantially the same cross-section as that of the tube, and having a melting point substantially as high as that of the glass body at the region of the seal, raising the temperature of the disc with the ring in contact with it to a temperature greatly in excess of the melting point of the glass ring, the depth of the glass ring being so chosen that it will just wet the surface of the disc over the sealing area lowering the temperature, and bringing the glass tube to be sealed to the disc into contact with the wetted surface at a temperature such that the tube adheres to the wetted surface without control being lost of its shape.

6. A process for the high temperature sealing of a glass body in the form of a tube to a disc of sapphire which comprises placing the disc in a crucible with a glass ring of the same composition as that of the glass body and the same cross section as that of the glass body and having substantially the same coefficient of linear thermal expansion as the sapphire suitably positioned thereon heating to such a temperature that the glass wets the disc over the sealing area, lowering the temperature and bringing the glass tube to be sealed to the disc into contact with the sealing area at a controlled rate such that the temperature of its sealing surface is brought substantially to the temperature of the sealing area at a predetermined rate, the temperature of the sealing area being such that the sealing surface of the glass tube becomes united to the wetted area without the tube becoming softened beyond the point at which control of its shape is lost.

7. A process for the high temperature sealing of a glass body in the form of a tube to a disc of sapphire, said glass body comprising a main tube terminating in a series of zones of glasses of different coefficients of thermal expansion graded from the end of the glass tube, at which the linear coefficient of thermal expansion is substantially the same as that of sapphire through successive different coefficients of thermal expansion towards the coefficient of thermal expansion of the main tube, which comprises placing the sapphire disc in a crucible, positioning on said disc a ring of glass of substantially the same cross section as the end of the glass body and of the same composition as the glass forming the end of said glass body, heating the disc with the glass ring thereon to such a temperature that the glass wets the disc over the sealing area, lowering the temperature and bringing the glass tube to be sealed to the disc into contact with the sealing area at a controlled rate such that the temperature of its sealing surface is brought substantially to the temperature of the sealing area at a predetermined rate, the temperature of the sealing area being such that the sealing surface of the glass tube becomes united to the wetted area without the glass tube becoming softened beyond the point at which control of its shape is lost.

8. A process for the high temperature sealing of a glass body in the form of a tube to a disc of sapphire, which comprises placing the disc in a crucible, positioning on the disc a glass ring of substantially the same cross section as that of the glass body and having the surface thereof in contact with the sapphire ground and polished and having substantially the same coefficient of linear thermal expansion as the sapphire heating to such a temperature that the glass wets the disc over the sealing area, lowering the temperature and bringing the glass tube to be sealed to the disc into contact with the sealing area at a controlled rate such that the temperature of its sealing surface is brought substantially to the temperature of the sealing area at a predetermined rate, the temperature of the sealing area being such that the sealing surface of the glass tube becomes united to the wetted area without the tube becoming softened beyond the point at which control of its shape is lost.

9. A process for the high temperature sealing of a glass body in the form of a tube to a disc of sapphire, which comprises placing the disc in a crucible, positioning on the disc a glass ring of the same composition as that of the glass body and of substantially the same cross section as that of the glass body and having the surface thereof in contact with the sapphire ground and polished and having substantially the same coefficient of linear thermal expansion as the sapphire heating to such a temperature that the glass wets the disc over the sealing area, lowering the temperature and bringing the glass tube to be sealed to the disc into contact with the sealing area at a controlled rate such that the temperature of its sealing surface is brought substantially to the temperature of the sealing area as a predetermined rate, the temperature of the sealing area being such that the sealing surface of the glass tube becomes united to the wetted area without the tube becoming softened beyond the point at which control of its shape is lost.

10. A process for the high temperature sealing and a glass body in the form of a tube to a disc of sapphire, said glass body comprising a main tube terminating in a series of zones of glasses of different coefficients of thermal expansion graded from the end of the glass tube, at which the linear coefficient of thermal expansion is substantially the same as that of sapphire, through successive different coefficients of thermal expansion towards the coefficient of thermal expansion of the main tube, which comprises placing the sapphire disc in a crucible, positioning on said disc a ring of glass of substantially the same cross section as the end of the glass body and of the same composition as the glass forming the end of said glass body and having the surface thereof in contact with the sapphire ground flat and polished, heating the disc with the glass ring thereon to such a temperature that the glass wets the disc over the sealing area, lowering the temperature and bringing the glass tube to be sealed to the disc into contact with the sealing area at a controlled rate such that the temperature of its sealing surface is brought substantially to the temperature of the sealing area at a predetermined rate, the temperature of the sealing area being such that the sealing surface of the glass tube becomes united to the wetted area without the glass tube becoming softened beyond the point at which control of its shape is lost.

11. A process for the high temperature sealing of a glass body in the form of a tube to a disc of sapphire, said glass body comprising a main tube terminating in a series of zones of glasses of different coefficients of thermal expansion graded from the end of the glass tube, at which the linear coefficient of thermal expansion is substantially the same as that of sapphire, through successive different coefficients of thermal expansion towards the coefficient of thermal expansion of the main tube which comprises placing the sapphire disc in a crucible, positioning on said disc a ring of glass of substantially the same cross section as the end of the glass body and of the same composition as the glass forming the end of said glass body and having the surface thereof in contact with the sapphire and the surface thereof presented to the glass body both ground flat and polished, heating the disc with the glass ring thereon to such a temperature that the glass wets the disc over the sealing area, lowering the temperature and bringing the glass tube to be sealed to the disc into contact with the sealing area at a controlled rate such that the temperature of its sealing surface is brought substantially to the temperature of the sealing area at a predetermined rate, the temperature of the sealing area being such that the sealing surface of the glass tube becomes united to the wetted area without the glass tube becoming softened beyond the point at which control of its shape is lost.

J. L. CRASTON.

REFERENCES CITED

The following references are of record in the file of this patent:

UNITED STATES PATENTS

| Number | Name | Date |
|---|---|---|
| 2,227,770 | Ungewiss | Jan. 7, 1941 |
| 2,248,644 | Reger et al. | July 8, 1941 |
| 2,254,086 | Owen | Aug. 26, 1941 |
| 2,464,990 | Plagge | Mar. 22, 1949 |
| 2,499,854 | Ellefson | Mar. 7, 1950 |